G. A. DROSTE.
APPARATUS FOR GAMES.
APPLICATION FILED JULY 18, 1911.
1,039,500.
Patented Sept. 24, 1912.
2 SHEETS—SHEET 1.
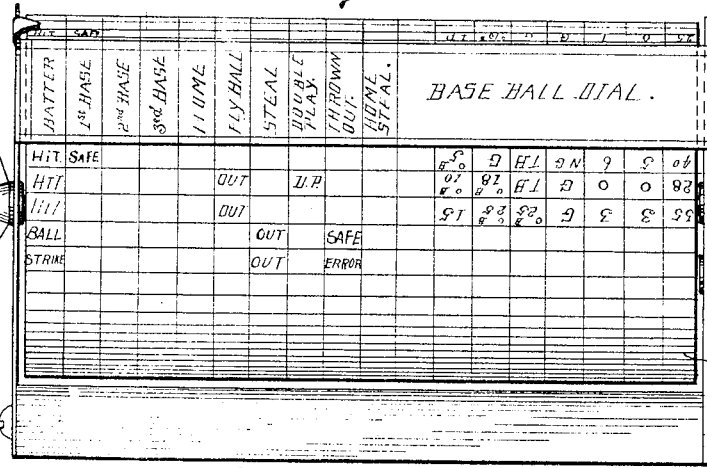
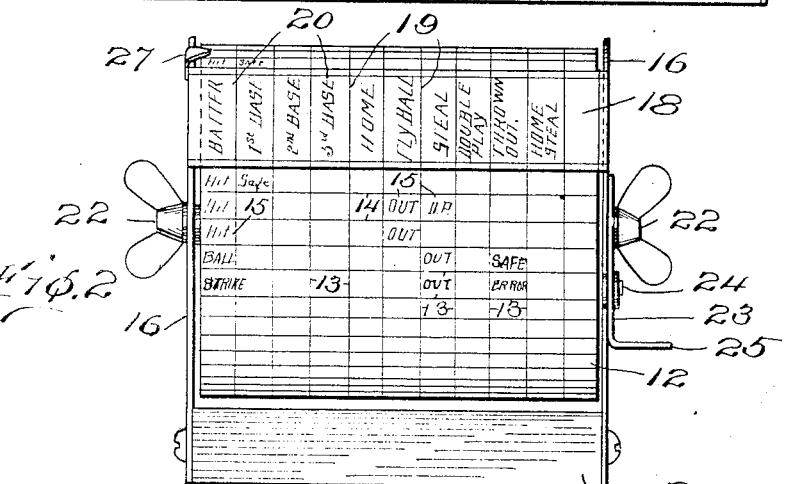
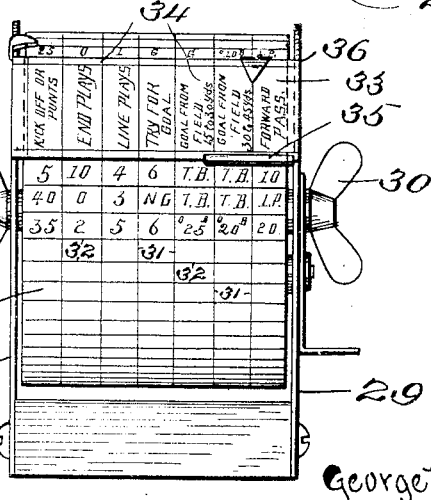
Witnesses
J. M. Fowler Jr.
L. L. Morrill
Inventor
George Adolph Droste,
By Mason Fenwick & Lawrence,
Attorneys

G. A. DROSTE.
APPARATUS FOR GAMES.
APPLICATION FILED JULY 18, 1911.

1,039,500.

Patented Sept. 24, 1912.

Witnesses
J. M. Fowler Jr.
L. L. Morrill

Inventor
George Adolph Droste,
By Mason Fenwick & Lawrence,
Attorneys

UNITED STATES PATENT OFFICE.

GEORGE A. DROSTE, OF SEATTLE, WASHINGTON.

APPARATUS FOR GAMES.

1,039,500.  Specification of Letters Patent.  Patented Sept. 24, 1912.

Application filed July 18, 1911. Serial No. 639,095.

*To all whom it may concern:*

Be it known that I, GEORGE A. DROSTE, a citizen of the United States, residing at Seattle, in the county of King and State of Washington, have invented certain new and useful Improvements in Apparatus for Games; and I do hereby declare the following to be a full, clear, and exact description of the invention, such as will enable others skilled in the art to which it appertains to make and use the same.

This invention relates to apparatus for playing games and has for an object to provide a board having representations of field sport grounds marked thereon, and with a dial or drum adapted to indicate by chance the play or move to be made upon the board.

A further object of the invention is to provide a board having markings thereon to indicate a game field with a drum rotatably mounted having a plurality of markings thereon which indicate by the position of the drum relative to an indicator the move or moves to be made, if any, upon the board.

With these and other objects in view the invention comprises certain novel constructions, combinations and arrangements of parts as will be hereinafter more fully described and claimed.

In the drawings:—Figure 1 is a view in side elevation of a drum having markings thereon for use with a board depicting fields of more than one sport. Fig. 2 is a view of a drum with only one sport indicated thereon, as base ball. Fig. 3 is a view of a drum with a single sport indicated thereon, as foot ball. Fig. 4 is a plan view of a game board for use in association with the drums shown at Figs. 1 to 3, being conventionally marked to indicate a foot ball field. Fig. 5 is a plan view of a board or the reverse of the same board, showing markings thereon to indicate a base ball field.

Like characters of reference indicate corresponding parts throughout the several views.

As shown at Figs. 4 and 5, a board is employed having markings thereon to indicate the markings of a game field, as for instance at Fig. 4 a board is shown marked to indicate a foot ball field, while at Fig. 5 a base ball field is shown. In the present invention no novelty is claimed for the marking appearing upon the boards as the same are marked simply to represent conventional fields. The moves upon the fields, as represented by Figs. 4 or 5, may be made either by markers which will plug into holes, as 10, or disks to be placed upon certain positions as indicated at 11 in Fig. 5.

Preferably the two boards, as indicated at Figs. 4 and 5 are formed upon opposite sides of the same structure, although such formation is immaterial to the present invention. For use with the board or boards, as for instance to play a game upon the board represented at Fig. 5, a drum 12 is employed, as shown at Fig. 2. This drum is provided with circumferential lines 13 and also longitudinal lines 14 by which the surface of the drum is divided into a large number of squares or rectangular spaces. Within these rectangular spaces are written or printed certain designations of the game of base ball, as indicated at 15. Along the side between the frame pieces 16 which support the drum, a strip 18 is employed having a plurality of lines 19 registering with the circumferential lines 13 of the drum, dividing such strip into a plurality of columns in which columns are printed terms to indicate the plays, as shown at 20. The frame 16 is supported upon a base 21 and winged nuts 22 are secured upon the axle of the drum, by which such drum is rotated. A means shown conventionally at 23 is also employed for increasing the tension upon the rotating drum to bring it to a stop sooner if desired, such means being simply a lever pivoted at 24 and by pressing down upon the extension 25 pressure is exerted upon the thumb nut against which it engages. A pointer 27 is also employed which indicates the line to be read when the game is being played. The pointer 27 indicates a longitudinal line or column upon the cylinder which is read from left to right or otherwise as may be desired and the directions contained within the rectangles of such column formed by the circumferential lines will be the directions for the several moves of the game being played. The pointer 27 might point to a longitudinal column which would contain only one word or a direction for the movement of one piece or it might contain directions in each of said squares so that each piece upon the board will be moved in accordance with the directions contained in such column.

As shown at Figs. 1 and 2, the strip 18 contains directions which are read in conjunction with those contained in the longitudinal column. It will be noted that the strip 18 contains designations for the batter and for each of the bases, also the designations "Fly ball," "Steal," "Double play," "Throw out," and "Home steal." There is no intention to control in this way the movement of the men at the bases except as it is indicated by the conjunction of the base designation upon the strip 18 and the designation upon the cylinder. As shown at Figs. 1 and 2, the designation to be read is under "Batter" "Hit" and under "First base" "Safe." This would so far control the action of the men on bases as would permit the batter who makes the hit to reach first base but he would get no farther than first base because there is no permission for him to reach other bases. If we suppose that the word "Safe" was transposed to the column under "Home" then it would mean a home run and the action of the men on bases would be such as to permit the runner to pass all of the bases and reach home. Under the designations "Fly ball" if under "Batter" we read "Hit" and under "Fly ball," "Out" then we will assume that the "Fly ball" is captured by some one on the bases or in the field. It is not necessary to know who captures the ball so long as the ball is caught, thereby registering one out. Under "Steal" if the designation is "Out" it indicates that a man on a base has attempted to steal a base and been put out. The other designations will be perfectly apparent from the foregoing. If on the first play the man at bat reaches first base safely and on the second play the same should again occur, it would of course necessitate the man on first taking second. If the designation "Out" should happen to be under second then the man taking second would be out on second. If the designation "Out" appeared under third the same would be true. If the word "Safe" appears under either of these bases or under "Home" it would indicate that the first man reaches these bases safely while the second man reaches first base.

For playing the game of foot ball a similar drum 28 is employed similarly mounted upon a frame 29 and rotated by winged nuts 30. The drum 28 is likewise divided by a plurality of circumferential lines 31 and longitudinal lines 32 to produce similar square or rectangular spaces upon the surface of the drum which are employed for receiving printing or writing to designate the moves of the game. A strip 33 similar to the strip 18 is also employed having likewise lines which form columns to receive designations of the play, as indicated at 34, but a slide 35 is preferably mounted upon the strip 33 provided with a pointer 36 which indicates any one of the several columns 34.

The drum shown at Fig. 3 and the right hand end of the drum, as shown at Fig. 1, being employed for playing a foot ball game the pointer 36 is employed to designate which play is to be made before the drum is spun to indicate the chance feature of such member. Such pointer is moved to indicate the plays as they occur in the regular play of the foot ball game and the chance device is used to indicate what is the outcome of such play.

Instead of making the drums for the two games separate, it is found desirable to combine them upon the same drum as shown at 37, in which case the designations for one game are at one end of the drum while those for the other game are at the other end of the drum and reversed relative to each other. As shown at Fig. 1, the end of the drum at the left is arranged with designations for playing the base ball game and as shown the designations are right side up, while at the right hand end of the drum designations are employed for playing the foot ball game and the designations as seen are up side down. To employ this drum 37 for playing the foot ball game it is turned around and the opposite side will then show the foot ball characters in normal position and the base ball characters up side down.

Whatever the make of the drum and its mounting, the games are played by spinning the drum by engaging the winged nuts and when the drum comes to rest to read from the line indicated by the pointer, the play which is to be made upon either of the fields being then employed. The play, as designated by the line upon the drum, is then made upon the board by the player representing that particular side. Then the drum is spun by the player representing the other side and his play made in accordance with the designation appearing upon the drum.

I claim:—

1. The combination with a board marked to indicate a game field, of a drum having a stationary member indicating acts which are to be done in the playing of the game, and a cylinder mounted to rotate adjacent such strip and provided with columns read in conjunction with the designations upon such strip indicating how such acts are to be performed and the outcome of such acts.

2. The combination with a board having markings thereon to indicate a game field, of a strip carrying designations of acts to be performed upon such field, and a drum mounted to rotate adjacent such strip and having spaces corresponding to the designations upon the strip and indicating by chance the performance and outcome of the act indicated upon the strip.

3. The combination with a board marked to indicate a game field, of a drum having longitudinal and circumferential lines dividing the surface into longitudinal and circumferential columns, a strip mounted adjacent the drum and having indications corresponding to the circumferential columns indicating acts to be performed upon the board, and indications appearing in the longitudinal columns of the drum which when read in conjunction with the indications upon the strip form directions as to how such acts are to be performed and the outcome of such acts.

In testimony whereof I affix my signature in presence of two witnesses.

GEORGE A. DROSTE.

Witnesses:
G. WARD KEMP,
W. B. NEIGHBORS.